US012526559B2

(12) United States Patent
Nakahira (10) Patent No.: US 12,526,559 B2
(45) Date of Patent: Jan. 13, 2026

(54) CONTROL DEVICE, STORAGE MEDIUM, AND OPTICAL COMMUNICATION SYSTEM

(71) Applicant: Oki Electric Industry Co., Ltd., Tokyo (JP)

(72) Inventor: Yoshihiro Nakahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 310 days.

(21) Appl. No.: 18/498,883

(22) Filed: Oct. 31, 2023

(65) Prior Publication Data

US 2024/0179440 A1 May 30, 2024

(30) Foreign Application Priority Data

Nov. 29, 2022 (JP) ................................. 2022-189939

(51) Int. Cl.
*H04Q 11/00* (2006.01)
*H04J 14/02* (2006.01)

(52) U.S. Cl.
CPC ...... *H04Q 11/0067* (2013.01); *H04J 14/0227* (2013.01); *H04J 14/0278* (2013.01); *H04Q 2011/0086* (2013.01)

(58) Field of Classification Search
CPC .................................................. H04Q 11/0067
See application file for complete search history.

(56) References Cited

U.S. PATENT DOCUMENTS

| | | | | |
|---|---|---|---|---|
| 2010/0239247 | A1* | 9/2010 | Kani | H04J 14/0282 398/41 |
| 2015/0037035 | A1* | 2/2015 | Sugawa | H04J 14/0282 398/66 |
| 2022/0029727 | A1* | 1/2022 | Bourgart | H04J 14/0246 |

FOREIGN PATENT DOCUMENTS

JP 2007-067952 A 3/2007

* cited by examiner

*Primary Examiner* — Shi K Li
(74) *Attorney, Agent, or Firm* — Rabin & Berdo, P.C.

(57) ABSTRACT

To achieve a highly efficient and power-saving communication network by switching between communication based on PtP connection and communication based on PtMP connection. In the optical communication system that includes a combination of PtP connection and PtMP connection according to the present invention, a ONU is switchable between a PtP connection transmission/reception mode and a PtMP connection transmission/reception mode and tune a wavelength to be used, the optical communication system includes an optical wavelength multiplexing/demultiplexing device between a core network and an ODN including the ONU, a predetermined number of first ports among a plurality of demultiplexing-side ports of the optical wavelength multiplexing/demultiplexing device are connected to the core network, a remaining second port is connected to a subscriber-side port of the OSU connected to the core network, and a control device instructs the optical terminal device in the optical communication system to switch a connection mode and the wavelength to be used by the ONU in response to change in communication traffic of a communication service.

7 Claims, 7 Drawing Sheets

CONTROL DEVICE, STORAGE MEDIUM, AND OPTICAL COMMUNICATION SYSTEM

CROSS REFERENCE TO RELATED APPLICATION(S)

This application is based upon and claims benefit of priority from Japanese Patent Application No. 2022-189939, filed on Nov. 29, 2022, the entire contents of which are incorporated herein by reference.

BACKGROUND

The present invention is applicable to a control device, storage medium, and optical communication system that control communication including a combination of point-to-point (PtP) connection and point-to-multipoint (PtMP) connection in optical communication using optical fibers (hereinafter, simply referred to as fibers).

For example, an optical communication method for PtP connection is used in a case where two optical communication devices are connected to respective ends of a single optical fiber. Examples of the PtP connection include G.9806 of the ITU-T standard.

Alternatively, for example, an optical communication method for PtMP connection is used in a case where a plurality of optical terminal device (optical network units: ONUs) is connected to a single optical line accommodation device (optical line terminal: OLT) via an optical distribution network (ODN). Examples of the PtMP connection include G.989 of the ITU-T standard.

The PtP connection occupies a single optical fiber or wavelength and is able to always maintain a communication state with its communication partner. This makes it possible to easily achieve a stable communication state and high-speed communication. However, another terminal apparatus is not able to use that optical fiber (or wavelength) even if communication is not performed between terminal apparatuses connected to optical terminal devices on respective sides, and this results in low efficiency in use of the fiber.

The PtMP connection shares a single fiber or wavelength with a plurality of ONUs through time division. Therefore, to perform uplink communication, it is necessary to start with establishing bit synchronization. The PtMP connection tends to have slower communication speed than the PtP connection; because PtMP needs short preamble patterns, the preamble may be overhead for data transfer. However, the PtMP connection achieves high efficiency in use of the fiber (or wavelength) since the single fiber between OLT and branches (splitter) is shared by the many ONUs (for example, 32 ONUs).

As described above, the PtP connection has advantage in high-speed performance, but the PtMP connection has advantage in efficiency in use of optical fibers. However, there has been no system configured to operate while appropriately switching its connection method depending on situations so far.

JP 2007-067952A discloses a method of distributing signals to optical fibers between a station and subscribers through broadcasting by switching optical switches disposed between the subscribers and optical splitters when an optical line terminal and optical network units are connected via the respective optical fibers and the station includes the optical splitters configured to make PtMP connection.

SUMMARY

However, according to the method described in JP 2007-067952A, the optical splitters are placed in the station and the splitters are NOT located for the purpose to provide PtMP connection between the station and subscribers. In other words, in JP 2007-067952A, the optical fibers between the station side and the subscriber side are for PtP connection, but no optical fiber for PtMP ODN connection is used between the station side and the subscriber side. At present, most of optical access networks in Japan are PtMP ODNs called PON, and the technology described in JP 2007-067952A is not applicable thereto.

Figure 7:
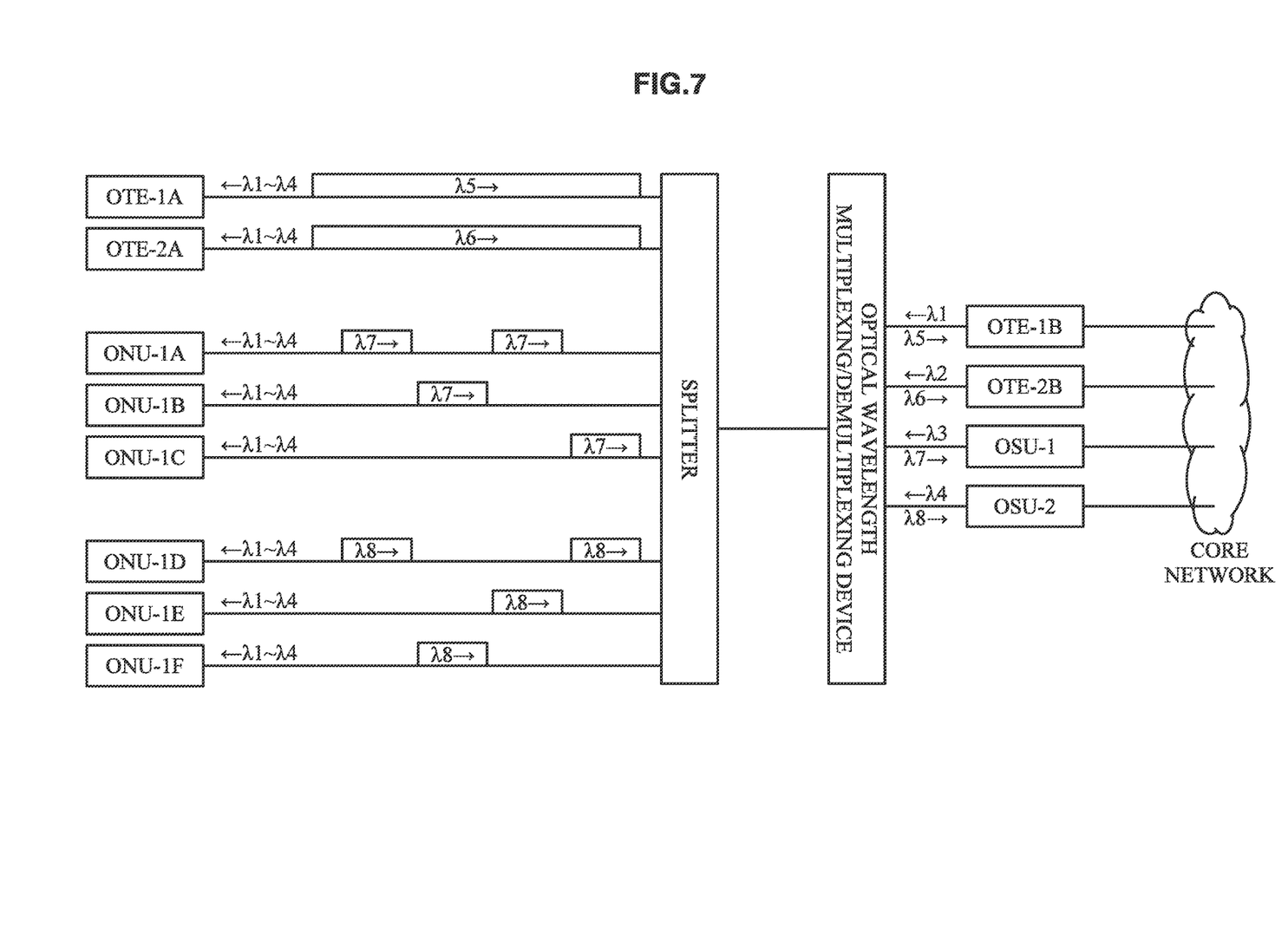
FIG. 7 is a configuration diagram illustrating a configuration of a system in which a single ODN shares a TWDM-PON and a WDM-PON.

In addition to the technology described in JP 2007-067952A, it may be possible to consider a system in which a single ODN includes a time and wavelength division multiplexing PON (TWDM-PON) and a WDM-PON as exemplified in FIG. 7 by combining existing technologies.

In FIG. 7, an optical terminal device of a communication device that makes PtP connection is referred to as optical transmission equipment (OTE). In addition, a station-side device of a communication device that makes PtMP connection is referred to as an optical subscriber unit (OSU) (an OSU-1 and an OSU-2 constitute an OLT), and a subscriber-side device is referred to as an ONU.

In FIG. 7, a pair of an OTE-1A and an OTE-1B communicates with each other at 400 Gb/s at a wavelength $\lambda 1$ in a downlink and at a wavelength $\lambda 5$ in an uplink. In addition, a pair of an OTE-2A and an OTE-2B communicates with each other at 400 Gb/s at wavelengths $\lambda 2$ and $\lambda 6$.

An ONU-1A communicates with the OSU-1 at 50 Gb/s, an ONU-1B communicates with the OSU-1 at 25 Gb/s, an ONU-1C communicates with the OSU-1 also at 25 Gb/s, and the total speed thereof is 100 Gb/s. They use a wavelength $\lambda 3$ in a downlink, and use a wavelength $\lambda 7$ in an uplink.

An ONU-1D communicates with the OSU-2 at 30 Gb/s, an ONU-1E communicates with the OSU-2 also at 30 Gb/s, an ONU-1F communicates with the OSU-2 at 40 Gb/s, and the total speed thereof is 100 Gb/s. They use a wavelength $\mu 4$ in a downlink, and use a wavelength $\lambda 8$ in an uplink.

Note that, in the downlinks, $\lambda 1$ to $\lambda 4$ are delivered to the respective OTEs and ONUs through broadcasting, but each of the OTEs or ONUs receives only a single wavelength.

However, the system illustrated in FIG. 7 merely shares a single ODN. For example, even if the ONU-1A tries to perform communication at 400 Gb/s, this is impossible. In present, there are some technologies of wavelength-tunable light source to change the connection destination of the OTE-1A to the OTE-2B or change the connection destination of the ONU-1A to the OSU-2, but there has been no technology of connecting an OTE to an OSU, or connecting an ONU to an OTE, and thereby operating efficiently.

Therefore, for example, it has been impossible to replace the OTE-1A with an ONU to use them even if amounts of traffic of the OTE-1A and the OTE-2A are small and amounts of traffic of the ONU-1A to the ONU-1F are large.

In a nod to the above-described problems, the present invention provides a control device, storage medium, and optical communication system that make it possible to achieve a highly efficient and power-saving communication network by switching between communication based on PtP connection and communication based on PtMP connection.

To solve this problem, according to a first aspect of an embodiment of the present invention, the following optical communication system may be provided. The system may include a combination of PtP connection through which PtP communication is performed between a subscriber-side optical terminal device (technically called as Optical Network Unit (ONU)) and an optical terminal device of a communication partner and PtMP connection through which PtMP communication is performed with a plurality of the ONUs accommodated to a station-side optical terminal device (technically called as Optical Subscriber Unit (OSU)). The ONU may be a device at a subscriber side on an ODN. The ONUs may have a PtP/PtMP connection transmission/reception mode (and transmission speed) selection function. (In the following sentences, transmission speed selection function is omitted but if the transmission/reception mode is shown, the transmission speed also selectable and is not mandatory. And the selectable speed is not always only 2; so each of PtP/PtMP mode can use more than 2 transmission speed if needed) In addition, the device may have wavelength tunable function. The optical communication system may include an optical wavelength multiplexing/demultiplexing device between a core network and the ODN including the ONU. A predetermined number of first ports among a plurality of multiplexing-side ports of the optical wavelength multiplexing/demultiplexing device may be connected to the core network. A remaining second port among the plurality of demultiplexing-side ports may be connected to a subscriber-side port of the OSU connected to the core network. A control device may instruct the ONU in the optical communication system to switch a connection mode and the wavelength to be used by the ONU in response to change in use situation of a communication service.

According to a second aspect of the embodiment of the present invention, the following control device may be provided. The device may be configured to instruct to switch a connection mode of each ONU in an optical communication system that includes the both (or combination) of PtP connection through which PtP communication is performed between the ONU and an optical terminal device of a communication partner and PtMP connection through which PtMP communication is performed with a plurality of the ONUs accommodated in an OSU. The optical communication system may include an optical wavelength multiplexing/demultiplexing device between a core network and an ODN including the ONUs. A predetermined number of first ports among a plurality of demultiplexing-side ports of the optical wavelength multiplexing/demultiplexing device may be connected to the core network. A remaining second port among the plurality of demultiplexing-side ports may be connected to a subscriber-side port of the OSU connected to the core network. The control device may instruct the ONU in the optical communication system to switch a PtP/PtMP connection mode and the wavelength to be used by the ONU in response to change in use situation of a communication service.

According to a third aspect of the embodiment of the present invention, a non-transitory computer readable storage medium may be provided. The medium may have a control program recorded thereon, the control program being a program of a control device configured to instruct to switch a PtP/PtMP connection mode of an ONU in an optical communication system including the both (combination) of PtP connection through which PtP communication is performed between the ONU and an optical terminal device of a communication partner and PtMP connection through which PtMP communication is performed with a plurality of the ONUs accommodated in an OSU. The optical communication system may include an optical wavelength multiplexing/demultiplexing device between a core network and an ODN including the ONU. A predetermined number of first ports among a plurality of demultiplexing-side ports of the optical wavelength multiplexing/demultiplexing device may be connected to the core network. A remaining second port among the plurality of demultiplexing-side ports may be connected to a subscriber-side port of the OSU connected to the core network. The storage medium may cause a computer to function as a switching instruction section configured to instruct the ONU in the optical communication system to switch a PtP/PtMP connection mode and a wavelength to be used by the ONU in response to change in communication traffic of a communication service.

According to the present invention, it is possible to achieve a highly efficient and power-saving communication network by switching between communication based on PtP connection and communication based on PtMP connection.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same function and structure are denoted with the same reference signs, and repeated explanation of these structural elements will be omitted.

(A) First Embodiment

Hereinafter, a control device, a control method, a control program, a storage medium, and an optical communication system according to a first embodiment of the present invention will be described in detail with reference to drawings.

(A-1) Configuration According to First Embodiment

Figure 1:
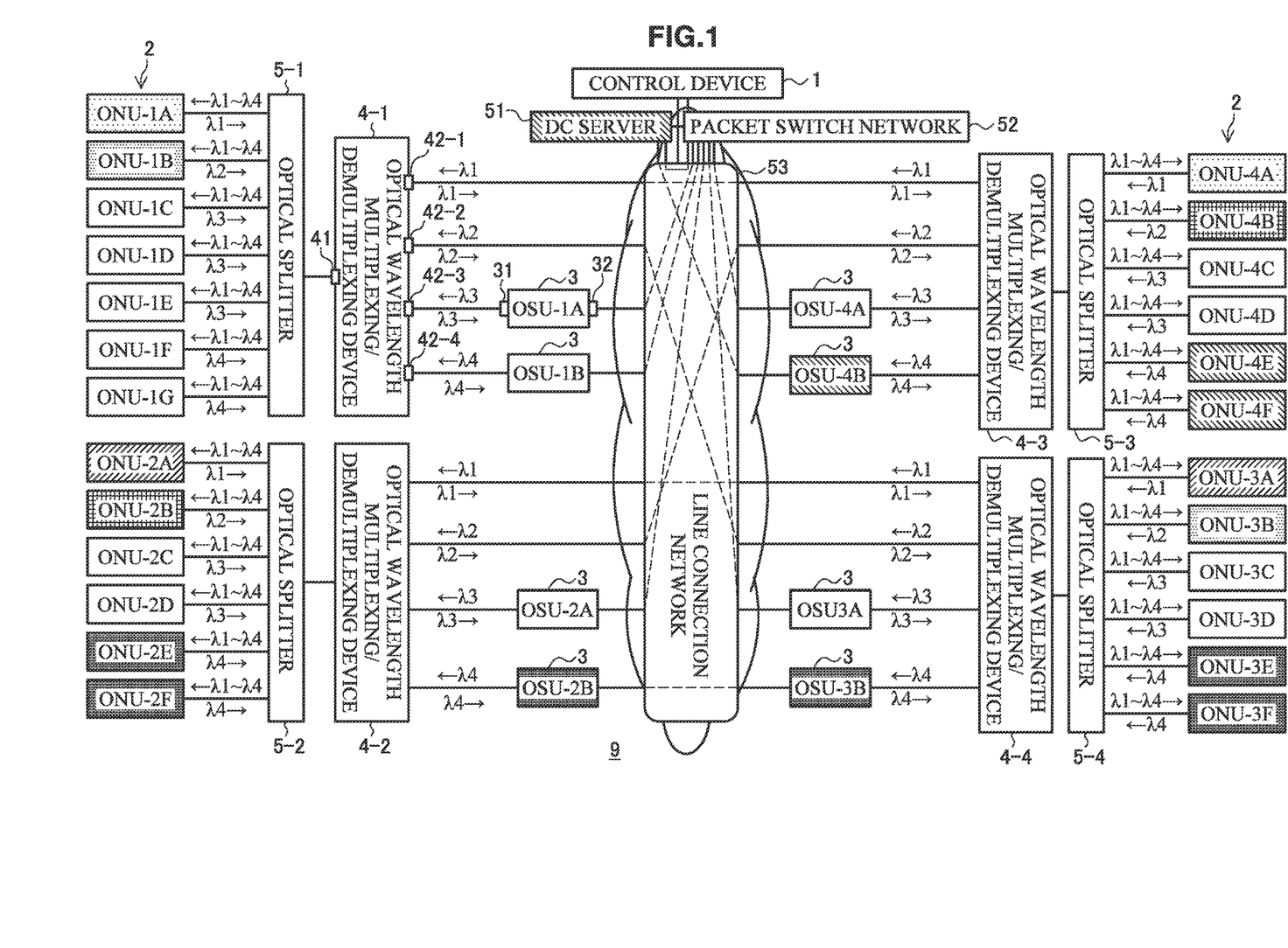
FIG. 1 is a configuration diagram illustrating a configuration of an optical communication system according to a first embodiment.

FIG. 1 is a configuration diagram illustrating a configuration of an optical communication system according to a first embodiment.

In FIG. 1, an optical communication system 9 according to the first embodiment includes a control device 1, OSUs 3 serving as OSUs (OSUs may be translated as station side optical terminal devices) of station-side communication devices, ONUs 2 serving as ONUs (ONUs may be translated as subscriber side optical terminal devices) of subscriber-side communication devices, optical wavelength multiplexing/demultiplexing devices 4 (4-1 to 4-4), and optical splitters 5 (5-1 to 5-4).

The optical communication system 9 includes a combination of communication based on PtP connection and communication based on PtMP connection, and has functional characteristics to be described below.

(1) Using ONUs (ONUs) that are able to switch between PtP connection and PtMP connection, and that have a wavelength-tunable light source.

(2) The control device 1 (control function) instructs the ONUs (optical terminal functions) on a transmission mode and a wavelength to be used.

(3) Configured as an access network in which some of outputs of subsequent stages (demultiplexing-side) of the optical wavelength multiplexing/demultiplexing devices 4 (wavelength multiplexing/demultiplexing functions) installed on the station side are connected to PtMP connection communication functions (OSUs) and then connected to a core network (a line connection network 53, a data center server (DC server) 51, a packet switch network 52, and the like), and the others are directly connected to the core network. A plurality of the access networks is configured to be connected to the core network. In addition, the control function configures settings for the ONUs such as the transmission modes, wavelength switching, and the PtMP connection communication function depending on communication traffic or communication service quality, to make a connection with an appropriate opposing communication section.

Note that, as will be described in a second embodiment, optical switch functions may be provided in subsequent stages of the optical wavelength multiplexing/demultiplexing functions.

In FIG. 1, with regard to the expressions "ONU" and "OSU", for example, x of "ONU-xy" is a number indicating a certain local group, and y is a letter for identifying an ONU in the group, for explanatory convenience. Hereinafter, the expression "ONU-xy" will be used to describe a specific ONU or OSU, and otherwise expressions such as ONUs 2 and OSUs 3 will be used to describe a common process.

[Control Device 1]

The control device 1 is connected to the packet switch network 52, and the line connection network 53, manages connection states of respective ONUs performing optical communication, and instructs the ONUs 2 and OSUs 3 to switch the connection states of the respective ONUs 2 to PtP connection or PtMP connection. In addition, the control device 1 instructs respective corresponding ONUs 2 to set wavelengths to be used by the respective corresponding ONUs 2 for transmission/reception.

Examples of means for the control device 1 to send the instructions to the ONUs 2 and OSUs 3 include a method of transferring in-band control signals or out-band control signals, a method of preparing auxiliary management and control channel (AMCC) for the line connection network 53, the OSUs 3, and the like and using a function of transmitting/receiving AMCC signals, and a method of issuing notifications by using optical signals of different wavelengths.

Figure 2:
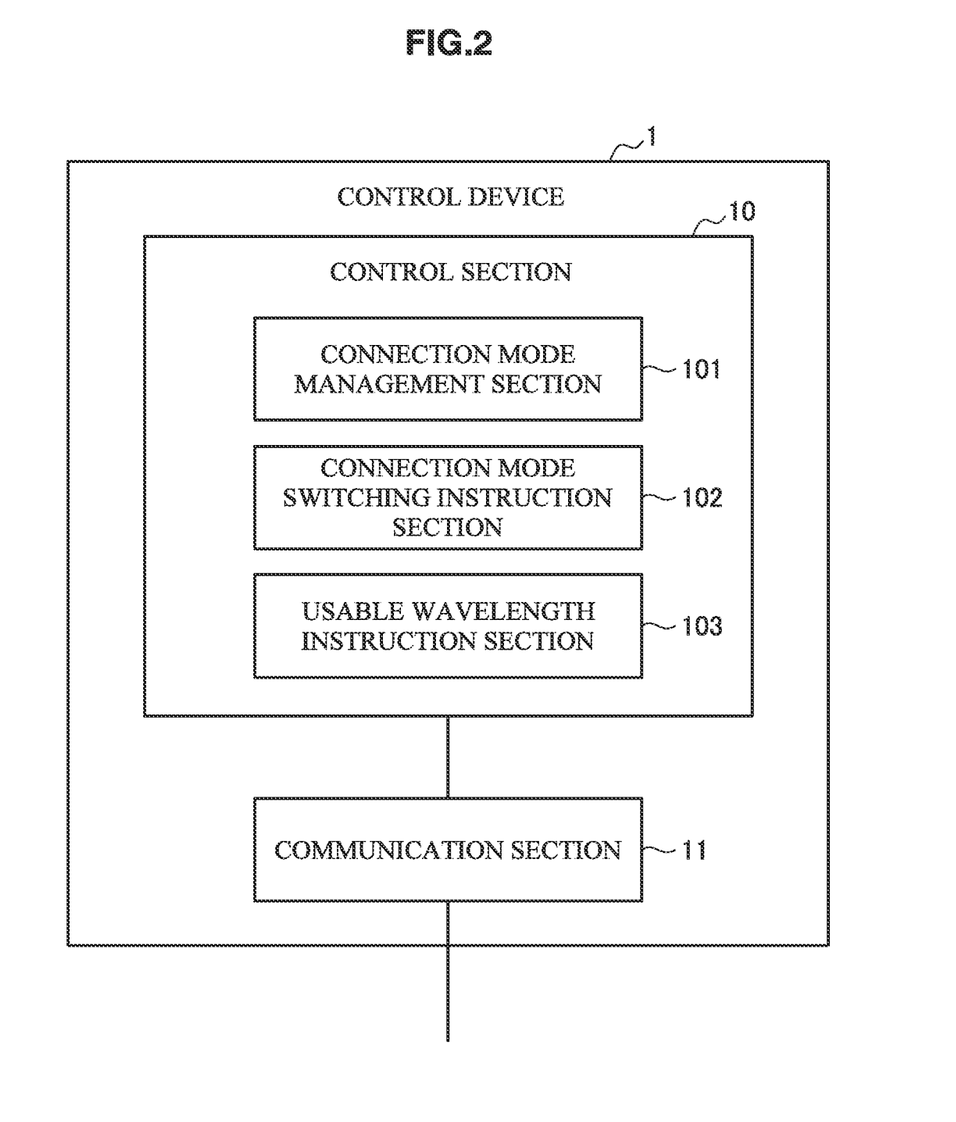
FIG. 2 is an internal configuration diagram illustrating an internal configuration of a control device according to the first embodiment.

FIG. 2 is a block diagram illustrating functions of the control device 1 according to the first embodiment. As illustrated in FIG. 2, the control device 1 includes a control section 10 and a communication section 11.

The communication section 11 is configured to connect to the packet switch network 52 or the line connection network 53 and perform communication through a corresponding communication method.

The control section 10 is a part that is responsible for functions of the control device 1. As illustrated in FIG. 2, the control section 10 includes a connection mode management section 101, a connection mode switching instruction section 102, and a usable wavelength instruction section 103.

The connection mode management section 101 is configured to manage connection states of the respective ONUs 2. For example, the connection mode management section 101 is able to constantly or periodically acquire information related to accommodation of the ONUs 2 from the OSUs 3 and recognize ONUs 2 that are making PtMP connection from the information. In addition, for example, the connection mode management section 101 is able to recognize ONUs 2 that are making PtP connection on a basis of information acquired from the AMCC prepared for the line connection network 53 or the like. As described above, it is possible to achieve the connection mode management section 101 by the method of transferring in-band control signals or out-band control signals or other methods.

The connection mode switching instruction section 102 instructs an ONU 2 or an OSU 3 to switch a connection mode of the corresponding ONU 2. Here, for example, the connection mode switching instruction section 102 issues a connection mode switching instruction when triggered by change in traffic state or report of traffic amount related to a service allocated to a wavelength. Alternatively, information about the type of service used is acquired and change in the information may serve as the trigger. In other words, a use situation of a communication service is not limited to the communication traffic (traffic amount), but may be the type of service to be used (file forwarding among sites, video on demand, videoconference, and the like) or characteristics (high-capacity communication, low-latency communication, multimedia communication, and the like).

For example, the connection mode switching instruction section 102 instructs to switch an ONU 2 that is making PtMP connection to PtP connection to stabilize its communication state (to increase bandwidth of connection) when an OSU 3 declares a service communication bandwidth (traffic amount) to the control device 1 and a value of the communication bandwidth related to communication with the ONU 2 that is making PtMP connection becomes large. Alternatively, for example, the connection mode switching instruction section 102 instructs to switch an ONU 2 that is making PtP connection to PtMP connection to decrease a wavelength and save electric power when a value of actual quantities of service traffic becomes reduced.

The usable wavelength instruction section 103 instructs an ONU 2 or an OSU 3 to set a wavelength to be used by the ONU 2 for transmission/reception.

[ONU 2]

Figure 3:
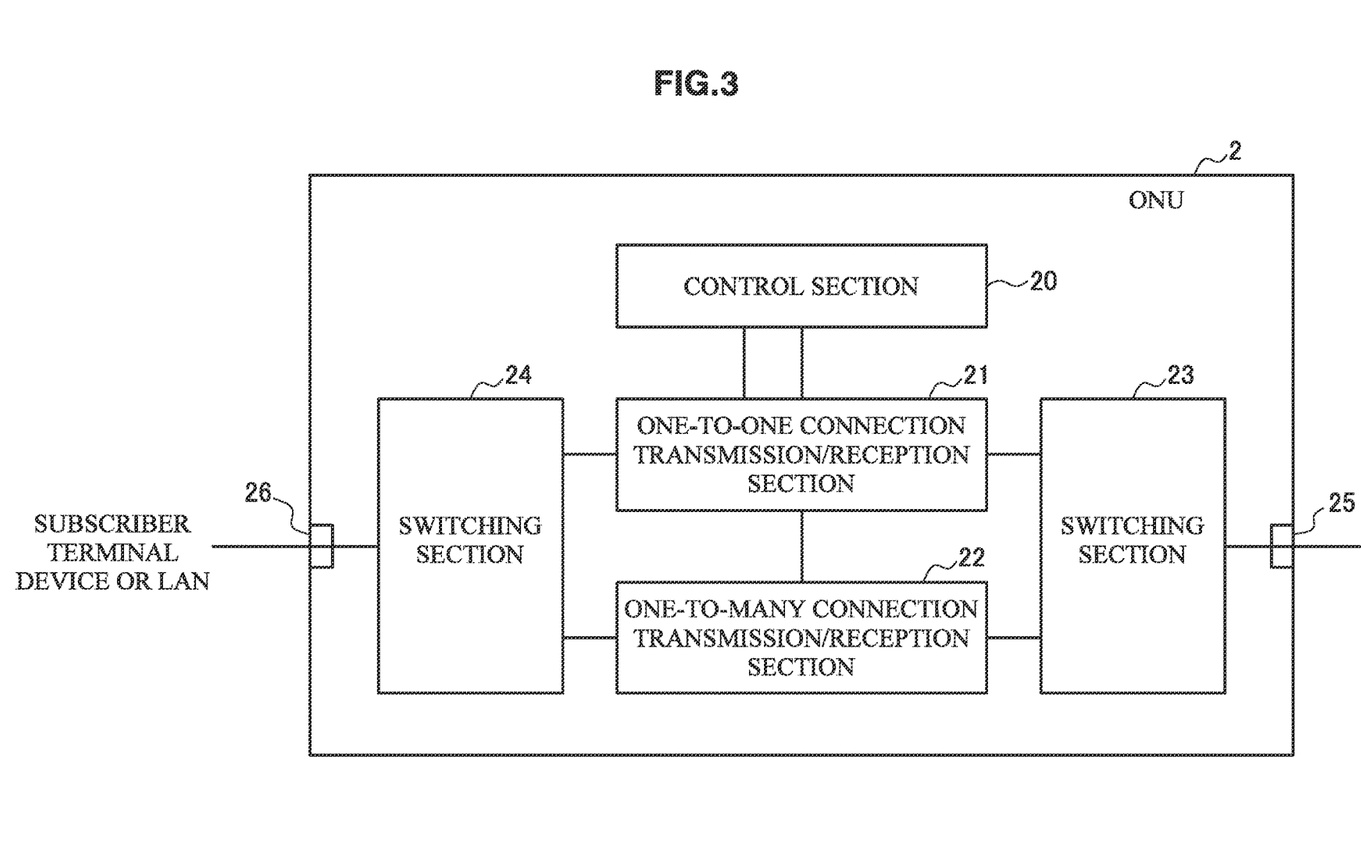
FIG. 3 is an internal configuration diagram illustrating an internal configuration of an ONU according to the first embodiment.

FIG. 3 is an internal configuration diagram illustrating an internal configuration of the ONU 2 according to the first embodiment.

As illustrated in FIG. 3, the ONU 2 includes a control section 20, a PtP connection transmission/reception section 21, a PtMP connection transmission/reception section 22, a switching section 23, a switching section 24, a station-side interface section 25, and a subscriber-side interface section 26.

The ONU 2 has a subscriber-side optical transmission/reception function that is able to switch its transmission/ reception mode between PtP connection and PtMP connection and change its transmission/reception optical wavelength.

As illustrated in FIG. 3, it is possible to achieve the ONU 2 by including the single PtP connection transmission/reception section 21 and the single PtMP connection transmission/reception section 22, making a selection through the switching section 23 and the switching section 24 that are disposed in preceding and subsequent stages thereof, and connecting the PtP connection transmission/reception section 21 and the PtMP connection transmission/reception section 22 to the control section 20 serving as a transmitter/receiver individual control function.

Needless to say, the configuration of the ONU 2 is not limited to the configuration illustrated in FIG. 3. For example, it is possible to use a circuit configuration whose function can be changed internally, or it is possible to use a method of programming and changing an electronic circuit in terms of software like an FPGA. In addition, it is also possible to provide a non-transitory computer readable storage medium having the program stored therein.

The subscriber-side interface section 26 is connected to a subscriber terminal apparatus or a LAN, and the station-side interface section 25 is connected to an optical splitter 5 via a single optical fiber.

The PtP connection transmission/reception section 21 is a part configured to perform transmission/reception to/from an opposing ONU 2 through PtP connection. For the PtP connection transmission/reception section 21, the control section 20 sets a transmission wavelength and a reception wavelength. In a case of reception, the PtP connection transmission/reception section 21 acquires the set reception wavelength among signal light beams received from the optical splitter 3 through broadcasting.

The PtMP connection transmission/reception section 22 is a part configured to share a single optical fiber or wavelength with other ONUs 2 through time division and perform transmission/reception to/from an opposing OSU 3. The PtMP connection transmission/reception section 22 sets a transmission wavelength and a reception wavelength that are allocated by the OSU 3.

Under the control of the control section 20, the switching section 24 is configured to switch between the transmission/reception sections (PtP connection transmission/reception section 21 and PtMP connection transmission/reception section 22) that get connected to the subscriber-side terminal apparatus or the LAN via the subscriber-side interface section 26.

Under the control of the control section 20, the switching section 23 is configured to switch between the transmission/reception sections (PtP connection transmission/reception section 21 and PtMP connection transmission/reception section 22) that get connected to the optical fiber via the station-side interface section 25.

The control section 20 is a part that is responsible for functions of the ONU 2. When receiving a connection mode switching instruction from the control device 1 or an OSU 3, the control section 20 switches the transmission/reception mode on a basis of the switching instruction.

[Optical Splitter 5]

The optical splitter 5 distributes light input from the station side to ONUs-xy through broadcasting. The optical splitter 5 multiplexes optical signals input from the plurality of ONUs-xy connected to the same optical splitter and outputs the multiplexed optical signals to the station side. Note that, the optical splitter 5 includes subscriber-side IFs and a station-side 1F. The subscriber-side IFs are connected to the respective ONUs-xy via optical fibers. The station-side 1F is connected to the optical wavelength multiplexing/demultiplexing device 4 in the station via an optical fiber.

[Optical Wavelength Multiplexing/Demultiplexing Device 4]

The optical wavelength multiplexing/demultiplexing device 4 includes a subscriber-side interface section (hereinafter, subscriber-side IF) 41 and a plurality of core-side interface sections (hereinafter, core-side IFs) 42-1 to 42-4. The subscriber-side IF 41 is connected to the optical splitter 5 via the optical fiber. Note that, the number of subscriber-side IFs 41 and the number of core-side IFs 42 are not limited. In this example, the number of core-side IFs 42 is four.

The optical wavelength multiplexing/demultiplexing device 4 selectively outputs the optical signals input from the subscriber-side IF 41 to the core-side IFs 42-1 to 42-4 depending on wavelengths.

Among the plurality of (four in this example) core-side IFs 42-1 to 42-4 of the optical wavelength multiplexing/demultiplexing device 4, two core-side IFs 42-1 and 42-2 are connected to the line connection network 53. Therefore, among the plurality of ONUs-xy, ONUs 2 that perform communication through PtP connection make it possible to directly connect to the line connection network 53 via the core-side IF 42-1 or 42-2 of the optical wavelength multiplexing/demultiplexing device 4. The plurality of core-side IFs of the optical wavelength multiplexing/demultiplexing device 4 is also referred to as "demultiplexing-sideports". Among the plurality of demultiplexing-side ports, the core-side IFs that connect to the line connection network 53 are also referred to as "first ports".

Note that, an optical signal directly connected from the optical wavelength multiplexing/demultiplexing device 4 to the line connection network 53 is a signal from the PtP connection transmission/reception section 21 of the ONU 2, and an optical transmission/reception section of a connection destination is a PtP connection transmission/reception 21 basically. This makes it possible to connect a pair of the optical transmission/reception functions to each other in a PtP connection mode. In other words, it can be said that the core-side IFs 42-1 and 42-2 of the optical wavelength multiplexing/demultiplexing device 4 connected to the line connection network 53 are ports (interface sections) compatible with the PtP connection.

However, in some cases, some core-side IFs may be connected to the data center server (hereinafter, referred to as a DC server) 51, the packet switch network 52, a station-side IF of an OSU 3. In the above description, the number of core-side IFs 42 that are directly connected to the line connection network 53 is two, but is not limited thereto.

In addition, among the plurality of core-side IFs 42-1 to 42-4 of the optical wavelength multiplexing/demultiplexing device 4, the other two core-side IFs 42-3 and 42-4 are connected to OSUs 3. Therefore, among the plurality of ONUs-xy, ONUs 2 that perform communication through PtMP connection connect to the OSUs 3 via the core-side IF 42-3 or 42-4 of the optical wavelength multiplexing/demultiplexing device 4. This makes it possible for the PtMP connection transmission/reception sections 22 of the ONUs 2 to connect to the OSUs 3 via the optical wavelength multiplexing/demultiplexing device 4. Therefore, it is possible to perform communication through PtMP connection. In other words, it can be said that the core-side IFs 42-3 and 42-4 of the optical wavelength multiplexing/demultiplexing device 4 connected to the OSUs 3 are ports (interface sections) compatible with the PtMP connection. Among the plurality of demultiplexing-side ports of the optical wavelength multiplexing/demultiplexing device 4, the remaining core-side IFs other than the first ports that connect to the line connection network 53 are also referred to as "second ports".

[OSU 3]

Figure 4:
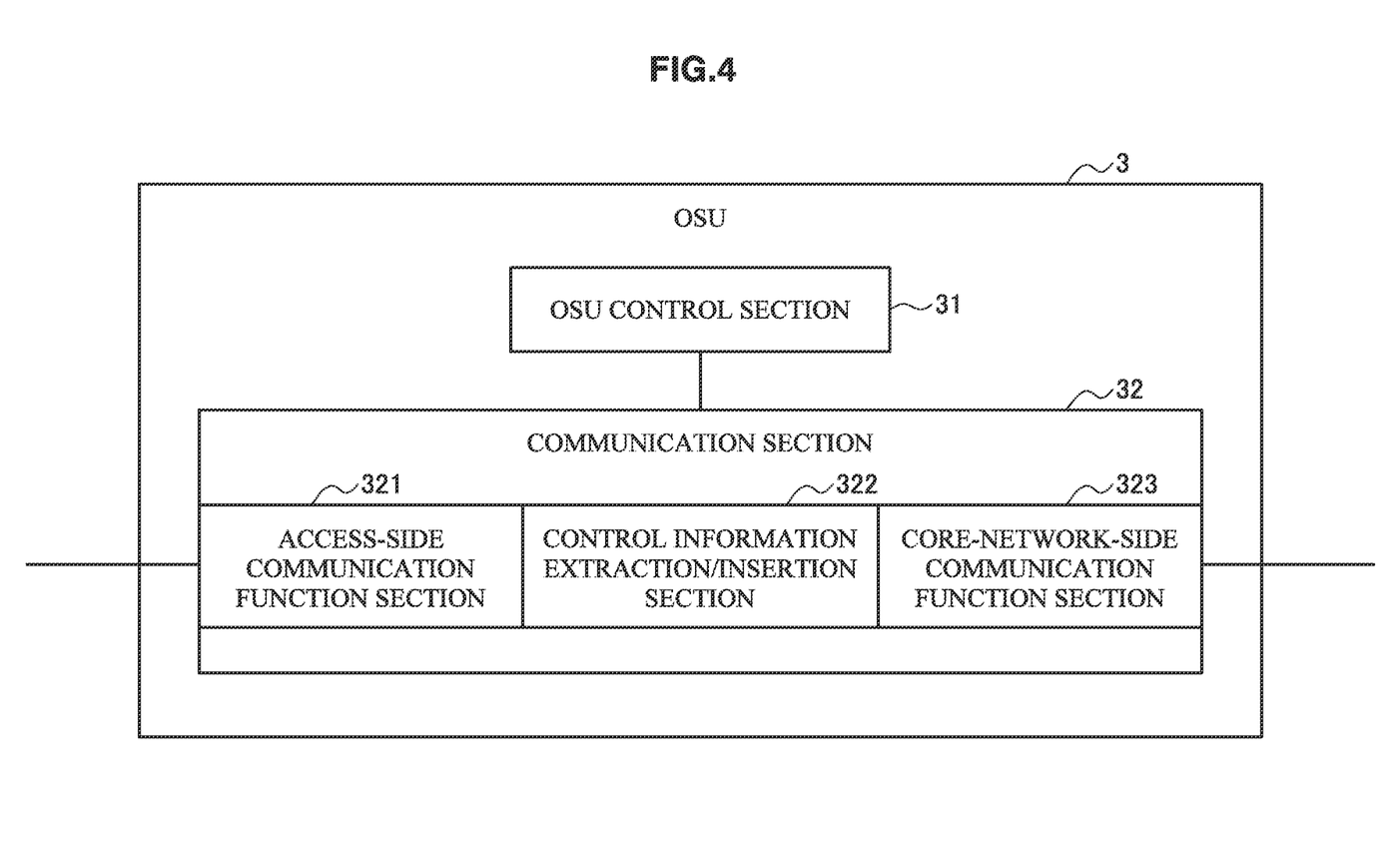
FIG. 4 is an internal configuration diagram illustrating an internal configuration of an OSU according to the first embodiment.

FIG. 4 is an internal configuration diagram illustrating an internal configuration of the OSU 3 according to the first embodiment.

In FIG. 4, the OSU 3 includes an OSU control section 31 and a communication section 32. The communication section 32 includes an access-side communication function section 321, a control information extraction/insertion section 322, and a core-network-side communication function section 323.

As the OSU 3, it is possible to use an OSU used in the TWDM-PON, for example. The core-side IF 32 of the OSU 3 includes a PtP connection interface section, and the core-side IF 32 is connected to the line connection network 53. Its connection destination may be any of a station-side IF of another OSU 3, an ONU 2 in the PtP connection mode, the DC server 51, and the packet switch network 52.

(A-2) Operation According to First Embodiment (A-2-1) Before Switching Connection Mode Next, connection operation in the optical communication system 9 according to the first embodiment will be described.

FIG. 1 illustrates connection states of the respective ONUs in the optical communication system 9. In FIG. 1, rectangular frames that represent the ONUs, OSUs, DC server, and the like serving as connection destinations of each other have a same hatch pattern.

The ONU-1A communicates with an ONU-4A at λ1 through PtP connection. The ONU-1B communicates with an ONU-3B at λ2 through PtP connection.

In a similar way, an ONU-2A communicates with an ONU-3A at λ1 through PtP connection. An ONU-2B communicates with an ONU-4B at λ2 through PtP connection. Such ONUs making PtP connection are assumed to perform high-capacity communication that uses entire bandwidth of a single wavelength.

The ONU-1C to an ONU-1E are connected to an OSU-1A at λ3, and are connected to the packet switch network 52 via the line connection network 53.

In a similar way, an ONU-1F to an ONU-1G are connected to an OSU-1B at λ4, an ONU-2C to an ONU-2D are connected to an OSU-2A at λ3, an ONU-3C to an ONU-3D are connected to an OSU-3A at λ3, and an ONU-4C to an ONU-4D are connected to an OSU-4A at λ3. Such OSUs (OSU-1A, OSU-1B, OSU-2A, OSU-3A, and OSU-4A) have core-side IFs 31 that are connected to the packet switch network 52 via the line connection network 53.

The packet switch network 52 makes it possible to establish communication between ONUs 2 by forwarding packets to the OSU 3 connected to its destination ONU 2 and transmitting the packets from the OSU 3 to the destination ONU 2. Between the ONUs 2, it is possible to perform highly flexible communication such as simultaneously communicating with a plurality of ONUs 2, but it is impossible to perform the high-capacity communication because the plurality of ONUs 2 shares the single OSU 3.

In addition, the communication with the OSU 3 through PtMP connection has a communication speed limit that is lower than PtP connection. In this respect, this is inadequate to the high-capacity communication.

An ONU-2E to an ONU-2F are connected to an OSU-2B at λ4, an ONU-3E to an ONU-3F are connected to an OSU-3B at λ4, and the OSU-2B and the OSU-3B are directly coupled via the line connection network 53. This makes it possible for these ONUs to perform stable communication without being influenced by traffic accommodated in other OSUs, and it is possible to perform communication with relatively high security. This may be effective when connecting a plurality of hubs of a company, for example.

An ONU-4E to an ONU-4F are connected to an OSU-4B at λ4, are connected to the DC server 51, and are able to receive a general cloud service. Note that, the ONU-1C to ONU-1E, ONU-1F to ONU-1G, ONU-2C to ONU-2D, ONU-3C to ONU-3D, and ONU-4C to ONU-4D are able to connect to the DC server 51 via the packet switch network 52.

(A-2-2) Switching of Connection Mode associated with Change in Traffic State

Next, operation to be performed when a traffic state change will be described with reference to FIG. 1 and FIG. 5.

Figure 5:
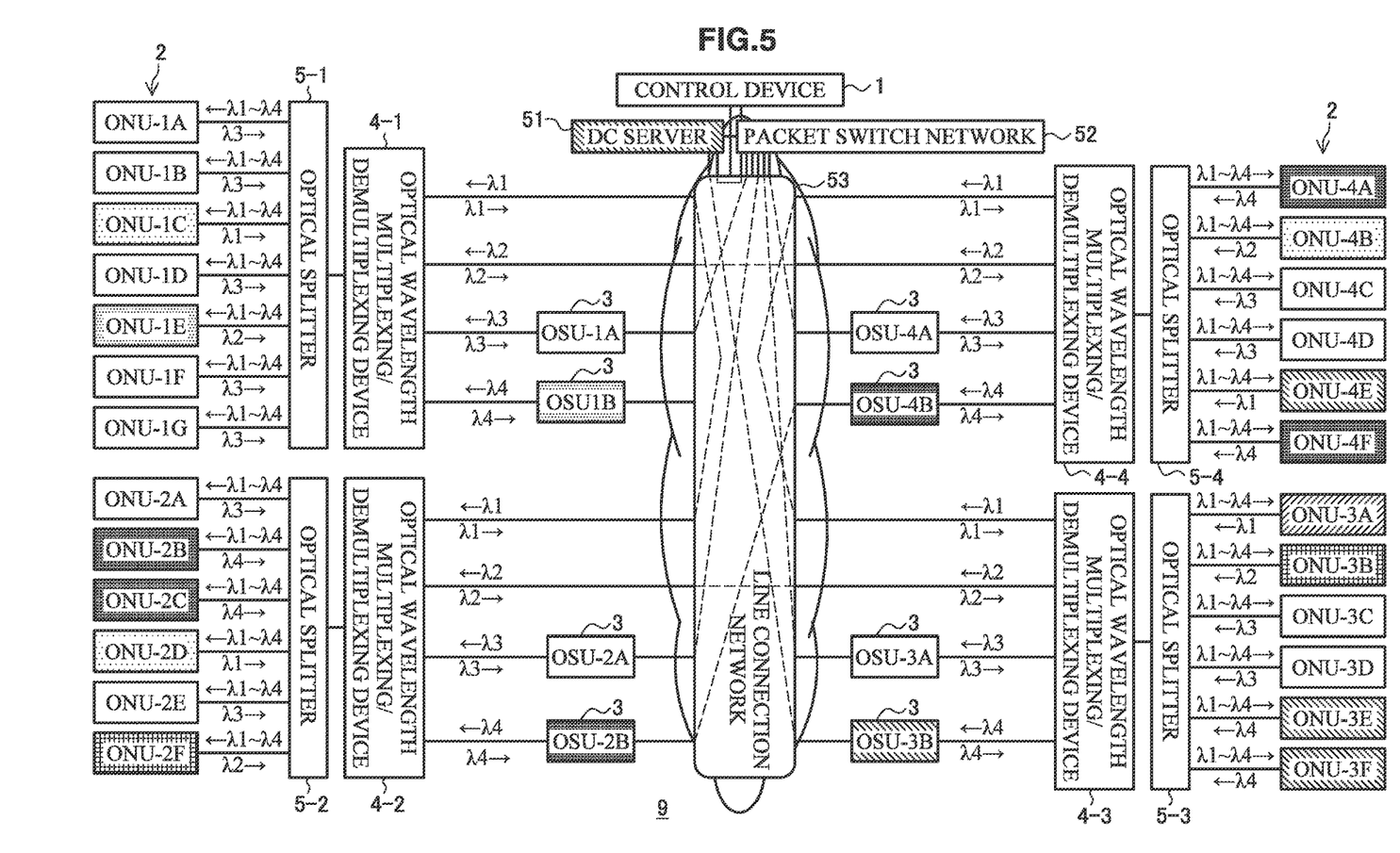
FIG. 5 is an explanatory diagram for describing a situation of the optical communication system according to the first embodiment, the situation being obtained when a connection state is changed.

FIG. 5 illustrates a case where time passes (for example 3 hours later) from the situation illustrated in FIG. 1 and services and communication partners of the respective ONUs 2 are changed.

(A-2-2-1) Switching from PtMP Connection to PtP Connection

In FIG. 1, the ONU-1C and the ONU-2D consume less traffic and need to communicate with many ONUs 2 and the DC server 51. However, it is assumed that as time passes, the ONU-1C and the ONU-2D enter a state of performing high-capacity communication only with each other, and the ONU-1A and the ONU-2A that have needed large bandwidth are changed their state as follows. In the new state, ONU-1A and the ONU-2A do not need large bandwidth but they have to communicate with many ONUs 2 and the DC server 51.

At this time, the ONU-1 and the ONU-2D change their wavelengths to λ1, and get directly connected from the optical splitters 5 to the line connection network 53 via the optical wavelength multiplexing/demultiplexing devices 4, to get connected to each other via the line connection network 53. In addition, the ONU-1A and the ONU-2A change their wavelengths to λ3, and get connected to the OSU-1A and the OSU-2A, respectively.

In other words, in FIG. 1, the ONU-1C and the ONU-2D consuming relatively less traffic make PtMP connection. However, since the traffic has increased, the ONU-1C and the ONU-2D switch their connection mode to PtP connection in response to the connection mode switching instruction from the control device 1 and the OSUs 3. This makes it possible for the ONU-1C and the ONU-2D to perform communication with each other through PtP connection, and it is possible to perform high-capacity communication.

Here, an example of a method of controlling over switching from PtMP connection to PtP connection in the above-described case will be described.

For example, the control device 1 manages the connection modes of the ONUs 2. For example, to recognize ONUs 2 that are performing communication through PtMP connection, the connection mode management section 101 of the control device 1 periodically acquires information for identifying ONUs 2 accommodated in the respective OSUs 3 from the respective OSUs 3. In addition, for example, to recognize ONUs 2 that are performing communication through PtP connection, the connection mode management section 101 acquires information obtained by the AMCC prepared for the line connection network 53 or the like. In such a way, it is possible for the connection mode management section 101 of the control device 1 to recognize states of the connection modes of the ONUs 2.

In addition, the connection mode switching instruction section 102 of the control device 1 instructs target ONU 2 and OSU 3 to switch the connection mode when some trigger is input, for example, amount of traffic volume is changed requested by services.

Note that, it is assumed that the control device 1 preliminarily sets information that associates an ONU 2 and a service to be provided to a subscriber terminal apparatus or the like via the ONU 2. For example, the control device 1 holds information that associates OSU identification information for identifying an OSU 3 with ONU identification information for identifying an ONU 2 accommodated in the OSU 3. In addition, the control device 1 holds information that associates the ONU identification information for identifying the ONU 2 with service identification information related to a service to be provided via the ONU 2. Therefore, when a traffic amount of the service has changed, it is possible for the connection mode switching instruction section 102 to recognize the ONU 2 related to the service as a connection mode switching target.

As described above, in a case of switching the ONU-1C and the ONU-2D that have performing communication through PtMP connection to PtP connection, the connection mode switching instruction section 102 of the control device 1 transmits a control signal to the OSU-3A and the OSU-2A that accommodate the ONU-1C and the ONU-2D, the control signal including a connection mode switching instruction for the ONU-1C and the ONU-2D.

The OSU-3A that has received the control signal from the control device 1 instructs the ONU-1C to switch its connection mode. At this time, the control device 1 also designates a wavelength to be used by the ONU-1C for transmission/reception ($\lambda 1$ in this example).

Therefore, when the OSU-3A transmits the wavelength $\lambda 1$ designated by the control device 1 to the ONU-1C, the ONU-1C switches from the PtMP connection transmission/reception section 22 to the PtP connection transmission/reception section $\lambda 1$ to set $\lambda 1$ for the PtP connection transmission/reception section 21. This makes it possible to perform communication through PtP connection at the designated wavelength $\lambda 1$.

Note that, a similar connection mode switching process to the above-described process is performed on the ONU-2D. This makes it possible for the ONU-1C and the ONU-2D to connect to each other via the optical splitters 5, the optical wavelength multiplexing/demultiplexing devices 4, and the line connection network 53.

In similar ways, in a case where the ONU-1E, the ONU-2F, and the ONU-4E have to perform high-capacity communication with the ONU-4B, the ONU-3B, and the ONU-3A respectively, the ONU-1E switches to PtP connection to the ONU-4B at 12, the ONU-2F switches to PtP connection to the ONU-3B at $\lambda 2$, and the ONU-4E switches to PtP connection to the ONU-3A at $\lambda 1$.

(A-2-2-2) Switching from PtP Connection to PtMP Connection

In addition, in this example, it is assumed that the ONU-1A, the ONU-1B, the ONU-1D, the ONU-1F, and the ONU-1G consume very little traffic and the single OSU-1A is able to accommodate a whole traffic amount.

In such a case, such ONUs (ONU-1A, ONU-1B, ONU-1D, ONU-1F, and ONU-1G) connect to the single OSU-1A at $\lambda 3$. The OSU-1B is not used. The OSU-1B transitions to a stop mode or a power-saving mode, and this makes it possible to save electric power.

Here, an example of a method of controlling over switching from PtP connection to PtMP connection and an example of a process of aggregation of accommodation performed in the above-described case will be described.

For example, with regard to the ONU-1A and the ONU-1B that are targets of switching from PtP connection to PtMP connection, the connection mode switching instruction section 102 of the control device 1 transmits a control signal to the OSU-1A, the control signal including an instruction to switch to PtMP connection mode.

The OSU-1A that has received the control signal transmits a control signal to the ONU-1A and the ONU-1B at $\lambda 3$, the control signal including an instruction to switch to PtMP connection. When they received the control signals, the ONU-1A and the ONU-1B switch from the PtP connection transmission/reception section 21 to the PtMP connection transmission/reception section 22.

This allows the OSU-1A to newly accommodate the ONU-1A and the ONU-1B in addition to the ONU-1D that the OSU-1A has accommodated, and the ONU-1A, the ONU-1B, and the ONU-1D connect to the OSU-1A at $\lambda 3$.

Next, for example, it is assumed that the OSU-1A and the OSU-1B are able to transmit/receive control information including their traffic bandwidth to/from each other, and recognize their usage bandwidth.

Subsequently, if the OSU-1A is able to accommodate the whole traffic of ONU-1A, ONU-1F and ONU-1G, wavelengths are switched to $\lambda 3$ in such a manner that the ONU-1A accommodates the ONU-1F and the ONU-1G accommodated in the OSU-1B.

In that case, for example, the OSU-1B transmits a control signal to the ONU-1F and the ONU-1G that are accommodated in the OSU-1B, the control signal including an instruction to switch their wavelengths to $\lambda 3$. The ONU-1F and the ONU-1G that have received the control signal switch wavelengths of their PtMP connection transmission/reception sections 22 to $\lambda 3$, and this allows the ONU-1F and the ONU-1G to connect to the OSU-1A at $\lambda 3$.

As described above, when it is possible to aggregate the whole traffic amount into the OSU-1A or the OSU-1B, it becomes possible to partially stop operation of the OSU-1B and save electric power by accommodating all the ONUs performing communication through PtMP connection in any of the OSUs and reducing the number of wavelengths to be used.

In addition, in FIG. 5, it is assumed that state change happens in such a manner that the OSU-2B accommodates the ONU-2B and the ONU-2C, and the ONU-2B and the ONU-2C desirably communicate with the ONU-4A or the ONU-4F accommodated in the OSU-4B.

In addition, as described above, the ONU-1A, the ONU-1B, the ONU-1D, the ONU-1F, and the ONU-1G are accommodated in the OSU-1A. In addition, the ONU-2A and the ONU-2E are accommodated in the OSU-2A. The ONU-3C and the ONU-3D are accommodated in OSU-3A. The ONU-4C and the ONU-4D are accommodated in the OSU-4A. Such ONUs are able to connect to the packet switch network 52 via the OSUs and the line connection network 53 to communicate with each other and with the DC server 51.

Note that, the ONU-3E and the ONU-3F communicate with the DC server 51 via the OSU-3B.

Here, if three ONUs including the ONU-1C, the ONU-1E, and the ONU-1F connected to a same optical coupler have to simultaneously perform high-speed PtP communication, only two of the ONUs are able to perform communication in such a PtP connection mode at a maximum. In this case, this can be handled when the control function issues instructions in such a manner as to put two of the ONUs consuming large traffic into the PtP communication mode, put remaining one of the ONUs into the PtMP connection mode, and accommodate the remaining one of the ONUs in an OSU to reduce the number of other ONUs accommodated in the OSU or to reduce the traffic.

If the number of wavelengths can be twice the number of ONUs, such an issue can be solved by directly coupling wavelengths $\lambda 1$ to $\lambda Y$ with the line connection network 53 and connecting the wavelengths $\lambda(Y+1)$ to $\lambda(2Y)$ to OSUs, where Y represents the number of ONUs. If the number of wavelengths is not twice the number of ONUs, it is possible to relieve a problem that a connection destination becomes unforeseen by increasing the number of line connection networks or the number of accommodation OSUs.

(A-3) Advantageous Effect According to First Embodiment

As described above, according to the first embodiment, it is possible to simultaneously accommodate communication based on PtP connection and communication based on PtMP connection depending on characteristics of traffic and services, and this makes it possible to operate the system effectively while saving electric power.

(B) Second Embodiment

Next, a control device, a control method, a control program, a storage medium, and an optical communication system according to a second embodiment of the present invention will be described in detail with reference to drawings.

(B-1) Configuration According to Second Embodiment

Figure 6:
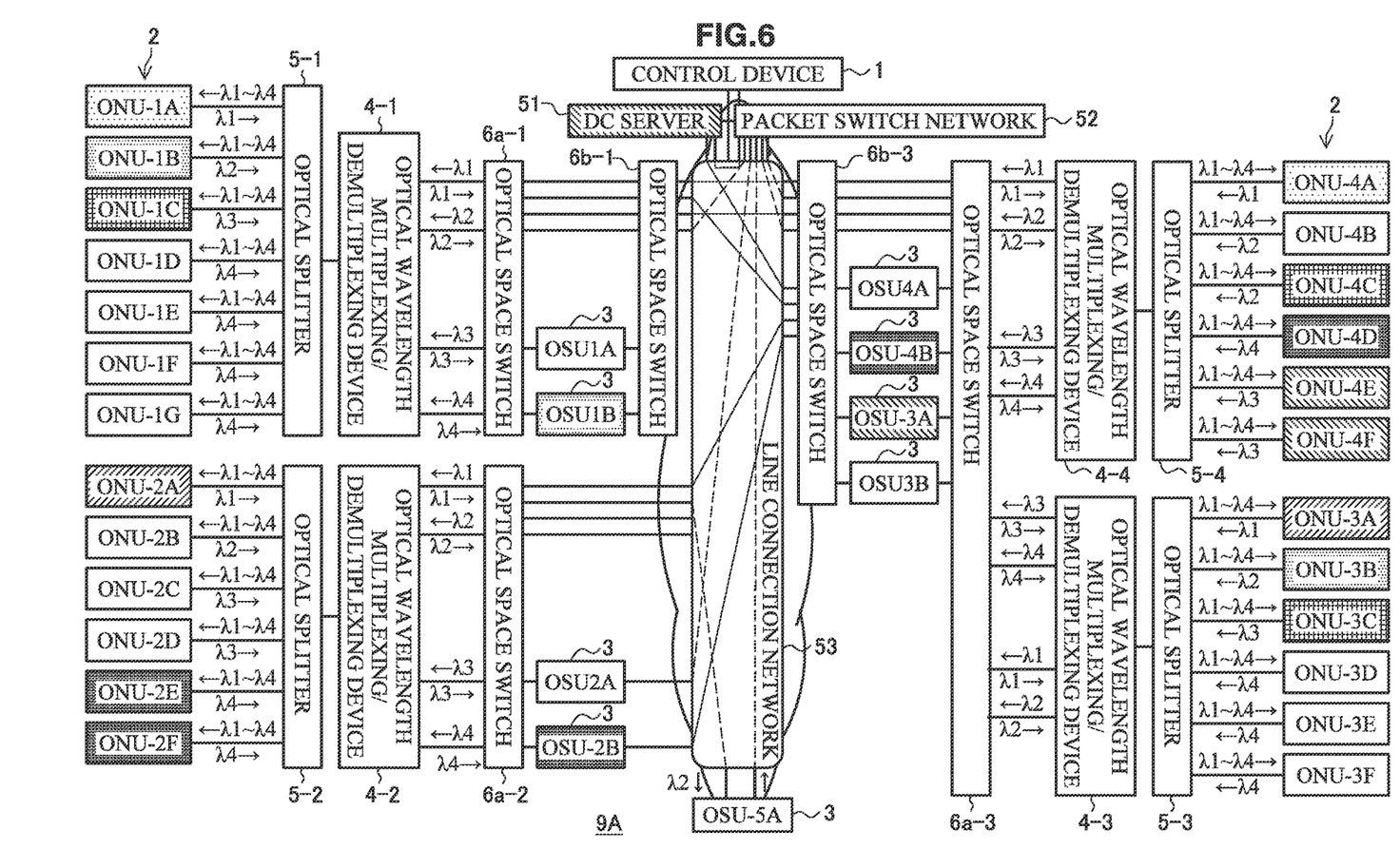
FIG. 6 is a configuration diagram illustrating a configuration of an optical communication system according to a second embodiment.

FIG. 6 is a configuration diagram illustrating a configuration of an optical communication system 9A according to the second embodiment.

The optical communication system according to the second embodiment illustrated in FIG. 6 has an almost similar configuration to the configuration of the optical communication system 9 according to the first embodiment illustrated in FIG. 1. However, the optical communication system 9A according to the second embodiment has the following configuration, and the control device 1 controls over connection methods of ONUs 2, OSUs 3, and space switches 6.

In the first embodiment, the number of ONUs that are able to enter the PtP connection mode is limited because the number of wavelengths of the optical wavelength multiplexing/demultiplexing devices 4 and the number of input interface sections of the line connection network 53 are limited even if many ONUs 2 desire to make high-speed PtP connection.

Therefore, according to the second embodiment, an optical space switch 6a-1 is disposed in a subsequent stage of the optical wavelength multiplexing/demultiplexing device 4 to prepare links that can be directly coupled to the line connection network 53 and that correspond to all of the respective wavelengths. In addition, an optical space switch 6b-1 is also disposed between the links and core-network-side IFs of the OSUs 3. Accordingly, the number of links that can be directly coupled to the line connection network 53 is suppressed to the same number as the first embodiment.

Note that, it is also possible to merge the two optical space switches 6a-1 and 6b-1 into a single optical switch and connect respective inputs/outputs of the OSUs 3 to the optical space switch, or it is also possible to use a wavelength selection output function obtained by integrating the functions of the optical wavelength multiplexing/demultiplexing device 4 and the functions of the optical space switch 6a directly coupled to the optical wavelength multiplexing/demultiplexing device 4. In addition, if the number of IFs of the line connection network 53 is not limited, it is also possible to omit the optical space switches 6b like the configuration of connection between the optical wavelength multiplexing/demultiplexing device 4-2 and the optical space switch 6a-2 illustrated in FIG. 6, for example.

Next, a way to handle a case where not the number of links directly coupled to the line connection network 53 but the number of OSUs 3 is not enough will be described. One of the simplest ways is to prepare many OSUs 3 like the case of preparing the links that can be directly coupled to the line connection network 53. However, this requires high device costs.

Therefore, in an exchange that accommodates a plurality of optical splitter networks such as the optical splitters 5-3 and 5-4, an optical space switch 6a-3 that connects outputs of the optical wavelength multiplexing/demultiplexing devices 4-3 and 4-4 is disposed in a subsequent stage of the optical wavelength multiplexing/demultiplexing devices 4-3 and 4-4 to share the OSUs (OSU-3A, OSU-3B, OSU-4A, and OSU-4B). This allows one of the optical splitter networks to use a surplus if anther of the optical splitter networks has low OSU demand. Note that, in the above description, sometimes it may have been assumed that the respective optical multiplexing/demultiplexing devices are disposed in different station (central office).

In addition, as a method of advancing sharing of the OSUs 3, an OSU-5A that can be shared and used by the all optical splitter networks is prepared, and this makes it possible to reduce the number of necessary OSUs. Note that, in FIG. 6, the OSU-5A accommodates the OSU-2B connected to the optical splitter 5-2.

(B-2) Operation According to Second Embodiment

Next, with reference to FIG. 6, connection operation in the optical communication system 9A according to the second embodiment will be described.

In FIG. 6, the ONU-1A communicates with the ONU-4A at $\lambda 1$, the ONU-1B communicates with the ONU-3B at $\lambda 2$, the ONU-1C communicates with the ONU-3C at $\lambda 3$, and the ONU-2A communicates with the ONU-3A at $\lambda 1$. Therefore, in FIG. 6, high-capacity communication is performed while using the entire bandwidth of a single wavelength between these described ONU pairs.

The ONU-1D to the ONU-1G are connected to the OSU-1A at $\lambda 4$ (optical space switch 6a-1 is connecting left port marked 24 and the port connecting to OSU-1A; the wavelength of OSU-1A is $\lambda 4$), and are connected to the packet switch network 52 via the line connection network 53. In similar ways, the ONU-2B is connected to the OSU-5A at $\lambda 2$ via the optical space switch 6a-2 and the line connection network 53 through a direct link, the ONU-2C to the ONU-2D are connected to the OSU-2A at $\lambda 3$, the ONU-3D to the ONU-3F are connected to the OSU-3BA at $\lambda 4$, the ONU-4B to the ONU-4C are connected to the OSU-4A at λ2, and core-network-side IFs of these OSUs are connected to the packet switch network 52 via the line connection network 53.

The packet switch network 52 forwards packets to the DC server 51 and an OSU 3 connected to its destination ONU 2. The packets forwarded to the OSU 3 are transmitted to the ONU 2 serving as a communication partner, and this makes it possible to perform communication between the ONUs. In addition, when the packets are transmitted to the DC server 51, it becomes possible for the ONU serving as the transmission source of the packets to communicate with the DC server 51. Between the ONUs accommodated in such OSUs 3, it is possible to perform highly flexible communication such as simultaneously communicating with a plurality of ONUs 2, but it is impossible to perform the high-capacity communication because the plurality of ONUs 2 share the single OSU 3.

In addition, the ONU-2E to ONU-2F are connected to the OSU-2B at λ4, the ONU-4D is connected to the OSU-4B at λ4, and the OSU-2B and the OSU-4B are directly coupled via the line connection network 53. This makes it possible for these ONUs accommodated in the OSU-2B and the OSU-4B to perform stable communication without being influenced by traffic accommodated in other OSUs, and it is also possible to perform communication with relatively high security.

In addition, the ONU-4E to ONU-4F are connected to the OSU-3A at λ3, are connected to the DC server 51, and are able to receive a general cloud service. As described above, the ONUs under the optical splitter 5-3 use the single OSU, and the ONUs under the optical splitter 5-4 use the three OSUs. However, in a case where the entire connection destinations of the ONUs under the splitter networks are entirely replaced with each other, the ONUs under the optical splitter 5-3 use the three OSUs, the ONUs under the optical splitter 5-4 use the single OSU, and it becomes possible to share the OSUs.

In addition, the ONUs under the optical splitter 5-2 use the OSU-5A in addition to the OSU-2A and the OSU-2B. When the ONUs under the optical splitter 5-2 consume less traffic, the OSU-5A is freed and this makes it possible to connect to another ONU under another busy optical splitter network.

(B-3) Advantageous Effect According to Second Embodiment

As described above, according to the second embodiment, it is possible to cancel the limitation on the number of ONUs requiring PtP connection and reduce the number of OSUs to be prepared thanks to sharing, in addition to the advantageous effects according to the first embodiment.

Although details of the preferable embodiments of the present invention have been described above with reference to the appended drawings, the embodiments of the present invention are not limited to the above-described examples. It will be clear to a person of ordinary skill in the art of the present invention that various modifications and improvements may be obtained within the scope of the technological concept recited by the scope of the patent claims, and these should obviously be understood as belonging to the range of technology of the present invention.

What is claimed is:

1. An optical communication system that includes a combination of PtP (Point to Point) connection through which PtP communication is performed between a subscriber-side optical terminal device i.e. ONU (Optical Network Unit) and an optical terminal device of a communication partner and PtMP (Point to Multi-Point) connection through which PtMP communication is performed with a plurality of the ONUs accommodated in a station-side optical terminal device i.e. OSU (Optical Subscriber Unit),
wherein the ONU is a device at a subscriber side on an ODN (Optical Distribution Network), the ONU being switchable between a PtP connection transmission/reception mode and a PtMP connection transmission/reception mode and tunable its wavelength to be used,
the optical communication system comprises an optical wavelength multiplexing/demultiplexing device between a core network and the ODN including the ONU,
a predetermined number of first ports among a plurality of demultiplexing-side ports of the optical wavelength multiplexing/demultiplexing device are connected to the core network,
a remaining second port among the plurality of demultiplexing-side ports is connected to a subscriber-side port of the OSU connected to the core network, and
a control device instructs the optical terminal device in the optical communication system to switch a connection mode and the wavelength to be used by the ONU in response to change in use situation of a communication service.

2. The optical communication system according to claim 1,
wherein the control device includes
a connection mode management section configured to manage the connection mode of the ONU in the optical communication system, and
a connection mode switching instruction section configured to instruct the ONU compatible with the communication service to switch to a connection mode depending on change in communication traffic on a basis of change in use situation of the communication service.

3. The optical communication system according to claim 1, wherein
when the control device instructs the ONU to switch from the PtMP connection to the PtP connection, the ONU switches to the PtP connection transmission/reception mode and changes a wavelength to be used for transmission to a wavelength allocated to the first port of the optical wavelength multiplexing/demultiplexing device to perform communication, and
when the control device instructs the ONU to switch from the PtP connection to the PtMP connection, the ONU switches to the PtMP connection transmission/reception mode and changes the wavelength to be used for transmission to a wavelength of the OSU connected to the second port of the optical wavelength multiplexing/demultiplexing device to perform communication.

4. The optical communication system according to claim 1, comprising
an optical space switch configured to switch connection to the core network or the OSU depending on the wavelength, the optical space switch being interposed between the optical wavelength multiplexing/demultiplexing device and the core network.

5. The optical communication system according to claim 1, comprising
an optical space switch configured to switch connection to the core network or the OSU depending on the wavelength, the optical space switch being interposed between the core network and a plurality of the optical wavelength multiplexing/demultiplexing devices, wherein the optical space switch uses the OSU while sharing the OSU between the ODNs accommodated in the respective optical wavelength multiplexing/demultiplexing devices.

6. A control device configured to instruct to switch a connection mode of an ONU in an optical communication system that includes a combination of PtP connection through which PtP communication is performed between the ONU and an optical terminal device of a communication partner and PtMP connection through which PtMP communication is performed with a plurality of the ONUs accommodated in an OSU, wherein the optical communication system includes an optical wavelength multiplexing/demultiplexing device between a core network and an ODN including the ONU, a predetermined number of first ports among a plurality of demultiplexing-side ports of the optical wavelength multiplexing/demultiplexing device are connected to the core network, a remaining second port among the plurality of demultiplexing-side ports is connected to a subscriber-side port of the OSU connected to the core network, and the control device instructs the optical terminal device in the optical communication system to switch a connection mode and a wavelength to be used by the ONU in response to change in use situation of a communication service.

7. A non-transitory computer readable storage medium having a control program recorded thereon, the control program being a control program of a control device configured to instruct to switch a connection mode of an ONU in an optical communication system including a combination of PtP connection through which PtP communication is performed between the ONU and an optical terminal device of a communication partner and PtMP connection through which PtMP communication is performed with a plurality of the ONUs accommodated in a OSU, wherein the optical communication system includes an optical wavelength multiplexing/demultiplexing device between a core network and an ODN including the ONU, a predetermined number of first ports among a plurality of demultiplexing-side ports of the optical wavelength multiplexing/demultiplexing device are connected to the core network, a remaining second port among the plurality of demultiplexing-side ports is connected to a subscriber-side port of the OSU connected to the core network, and the control program causes a computer to function as a switching instruction section configured to instruct the optical terminal device in the optical communication system to switch a connection mode and a wavelength to be used by the ONU in response to change in communication traffic of a communication service.

* * * * *